April 26, 1932. R. E. McINTOSH 1,855,645
CABLE CLIP
Filed Feb. 18, 1928
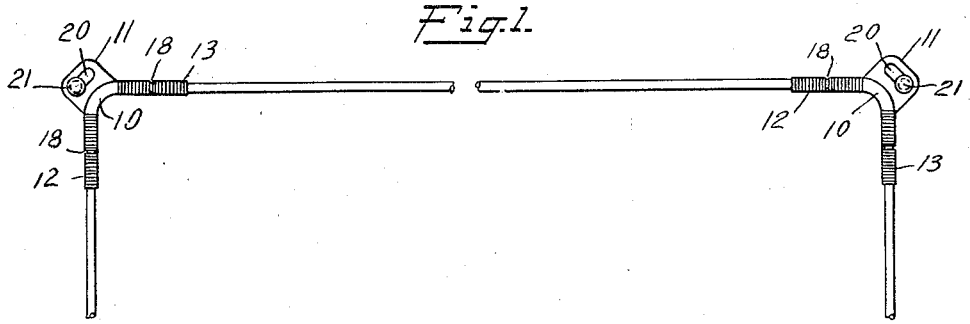
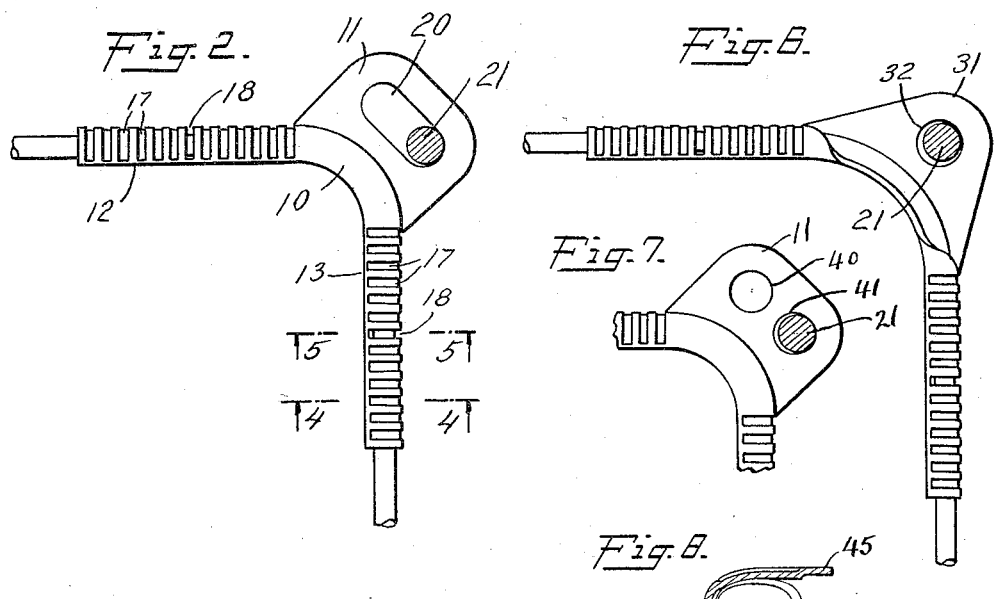
INVENTOR
Roy E. Mc. Intosh
BY Marshall & Hawley
ATTORNEYS Patented Apr. 26, 1932

1,855,645

UNITED STATES PATENT OFFICE

ROY E. McINTOSH, OF NEW YORK, N. Y., ASSIGNOR, BY MESNE ASSIGNMENTS, TO J. EDWARD OGDEN COMPANY, OF NEW YORK, N. Y., A CORPORATION OF NEW JERSEY

CABLE CLIP

Application filed February 18, 1928. Serial No. 255,463.

This invention relates to clips for supporting wires or cables.

The invention relates more particularly to clips for supporting span wires or cables. For efficient operation of a clip of the type specified the strain on the span supported by the clip should be transmitted direct to the clip securing means or supporting pin or, in other words, the axis of stress should intersect the clip securing means. When a span wire is supported by a fixed or rigidly secured clip and the wire sags or is thrown out of alinement with the securing means, the axis of the clip is then thrown out of alinement with the axis of stress.

This invention has for its salient object to provide a clip so constructed and arranged as to have superior gripping and securing qualities.

Another object of the invention is to provide a cable clip particularly adapted for supporting span wires or cables and so secured that the strain on the span will be transmitted direct to the clip securing means or, in other words, so constructed and secured that the portion of the clip secured to the span wire will always be disposed in alinement with the axis of stress on the span wire.

Further object of the invention will appear from the following specification taken in connection with the drawings, which form a part of this application, and in which Fig. 1 is an elevational view showing a span of wire having the two ends of the span secured by clips constructed in accordance with the invention;

Fig. 2 is an enlarged sectional view showing one of the clips;

Fig. 3 is a sectional elevation taken through the clip and cable prior to the closing of the clip;

Fig. 4 is a view taken substantially on line 4—4 of Fig. 2;

Fig. 5 is a sectional elevation taken substantially on line 5—5 of Fig. 2 before the clip is closed;

Fig. 6 is a view similar to Fig. 2 but showing a slightly different form of the invention;

Fig. 7 is a view similar to Fig. 2 but showing a slightly different form of the invention; and Figs. 8, 9 and 10 are sectional elevations showing a slightly modified form of clamp and illustrating the use of the clamp on different sizes of wires or cables.

The invention briefly described consists of a clip having a pair of clamping portions angularly disposed with reference to each other and having a tab extending laterally from a portion of the clip intermediate the angularly disposed clamping portions. The tab is provided with an opening therethrough adapted to receive a pin or other suitable securing means and so formed that when the clip is secured to a supporting structure and a span of wire is clamped therein, the axis of the clamping portion of the clip having the span secured thereto will be disposed in alinement with the pin or other securing means.

Further details of the invention will appear from the following description.

In the form of the invention illustrated in the drawings the clip comprises a central portion 10 having a tab 11 extending therefrom and a pair of clamping portions 12 and 13 angularly disposed with respect to each other and, as illustrated, disposed at substantially a right angle with reference to each other.

Each of the clamping portions is U-shaped in section and has substantially parallel walls 15 and 16 having transverse ribs 17 indented therein and having slots 18 intermediate the ends thereof to permit the clamp to be closed in sections. The indented ribs 17 assist in gripping the cable and materially increase the gripping quality of the clip. It will be noted that the walls 15 and 16 are substantially parallel to the tab 11.

In Figs. 1 and 2 the tab 11 has an elongated slot 20 formed therein for receiving the securing pin 21 or other suitable securing means. The slot is so formed that when the pin 21 is disposed in one end of the slot the axis of the pin will be disposed substantially in alinement with the axis of one of the clamping portions of the clip.

In Fig. 6 the tab 21 has a circular opening 32 therein adapted to receive the pin 21 and so located that the axes of the clamping portions will intersect the axis of the pin.

In the preferred form shown in Fig. 2, assuming that one end of a span wire has been secured, the other end is then drawn through one of the clamping portions of the clip when the clip is resting by gravity on the pin or, in other words, with the pin disposed at the upper end of the slot 20. The span wire is then stretched through the clamping portion and while it is held taut the clamping portion of the clip is closed and secured thereto. After the stretching means is released the clip will take the strain of the span and will move upwardly until the pin seats in the bottom of the slot or, in the form of the invention shown in Fig. 6, assumes the position illustrated. The drop wire is then bent around and secured in the other clamping portion of the clip.

In the form of the invention illustrated in Fig. 7, the tab 11 is provided with a pair of openings 40 and 41, these openings being disposed respectively in alinement with the angularly related clamping portions of the clip. When the clip shown in Fig. 7 is used in the manner illustrated in Fig. 1, the pin 21 will be disposed in the opening 40 as shown. The stress of the span will thus be disposed in alinement with the pin.

Figs. 8, 9 and 10 illustrate a slightly modified form of clamp so designed that it is adapted for clamping cables or wires having different dimensions. This is accomplished by providing one side of the clamp with an extension 45 adapted to be bent around the cable as shown in Figs. 9 and 10 to secure cables of different sizes.

It will be clear from the foregoing explanation that no matter which end of the clamp the strain is applied to the pin will be so disposed in the slot or opening in the tab such that the line of stress will intersect the pin and be located in line with the axis of that end portion of the clip. Also, it will be noted in the forms of the invention illustrated in Figs. 1, 2 and 6 that the line bisecting the angle between the clamping portions passes through the center of the opening in the tab.

The angular relation between the clamping portions of the clip and the bend in the wire between these clamping portions has a decided snubbing action which materially increases the gripping and holding effect of the clip. Furthermore, the relation of the tab and the form and location of the opening therethrough insure the transmission of the strain on the span direct to the supporting pin and insure the alinement of the portion of the clip secured to the span with the axis of stress.

Although certain specific embodiments of the invention have been particularly shown and described, it will be understood that the invention is capable of modification and that changes in the construction and in the arrangement of the various cooperating parts may be made without departing from the spirit or scope of the invention, as expressed in the following claims.

What I claim is:

1. A one-piece cable supporting clip comprising a pair of angularly related, rigidly connected, clamping portions, and an apertured tab disposed so as to include the intersection of the axes of said portions.

2. A one-piece cable supporting clip comprising a pair of angularly related, rigidly connected clamping portions, and a tab disposed intermediate said clamping portions, said tab having an elongated opening therein so located that the axes of the clamping portions will intersect the opening.

3. A one-piece, reversible cable supporting clip having angularly related, open-sided, clamping portions adapted to be bent about the cable and having an apertured tab adapted to shiftably engage a supporting pin, the tab being so apertured that the pin may be shifted into alignment with the direction of strain imposed upon the clip by the cable.

4. A one-piece cable supporting clip comprising a pair of angularly related, rigidly connected, clamping portions, having substantially parallel bendable clamping walls, one wall having a greater width than the other wall, whereby when said walls are clamped around a cable, the wider wall will extend across the cable toward the other wall, and an apertured tab disposed so as to include the intersection of the axes of said portions.

In witness whereof, I have hereunto set my hand this 14th day of February, 1928.

ROY E. McINTOSH.